UNITED STATES PATENT OFFICE.

GEORGE ALEXANDER DICK, OF LONDON, ENGLAND.

MANUFACTURE OF METALLIC ALLOYS.

SPECIFICATION forming part of Letters Patent No. 306,229, dated October 7, 1884.

Application filed April 23, 1884. (No specimens.)

*To all whom it may concern:*

Be it known that I, GEORGE ALEXANDER DICK, of London, England, engineer, have invented certain new and useful Improvements in the Manufacture of Metallic Alloys, of which the following is a specification.

My said invention relates to improvements in the manufacture of manganese copper; and it consists in separating the manganese contained in ferro-manganese, and causing it to combine with copper by melting the ferro-manganese with copper in the presence of silicium. At present manganese copper is ordinarily manufactured by reducing oxide of manganese with charcoal at a very high temperature, and then adding thereto the requisite quantity of copper. This process is very slow, and owing to the very high temperature employed the oxides attack the crucibles considerably, while at the same time only the richest and purest, and consequently a very expensive, oxide of manganese can be used. These objections are obviated by the method hereinafter described.

For the purposes of this invention I take a quantity of the following metals: First, ferro-manganese, selecting, by preference, that which contains a large percentage of manganese; second, pure copper. In some cases the ferro-manganese will be found to contain a sufficient quantity of silicium; but when that is not the case a quantity of silicious iron containing, by preference, a large percentage of silicium is added to the above-named metals. These metals are melted together in a crucible, and upon pouring the melted mass out into ordinary molds it will be found that the manganese has combined with the copper, while the iron, combined with the silicium, forms a layer upon the manganese copper. This layer of iron and silicium is removed, and the manganese copper run into ingots.

I have found that the greater the quantity of silicium contained in the mixture the more perfect is the separation of the manganese copper from the iron and silicium; but a quantity of silicium as small as one per cent. of the manganese present suffices to produce the desired effect.

I have found that advantageous results are obtained by regulating the proportions of the various metals in such a way that the quantity of manganese in the manufactured manganese copper is from about forty to sixty per cent. of the copper, and that the quantity of silicium present is about two per cent. of that of the manganese.

The analyses of the various metals (ferro-manganese, silicious iron, and silicated ferro-manganese) sold in the market being known, it is a simple matter to arrange the desired proportions and to avoid in the process the employment of much iron.

I am aware that iron and also manganese, either separately or combined together in the form of ferro-manganese, have been previously used to improve brass and gun-metal, (alloys of copper and zinc or tin in various proportions,) but in such process the ferro-manganese enters into a permanent union with the alloys mentioned. In the present invention either ferro-manganese containing silicium in proper proportions, or ferro-manganese and silicious iron are melted together with pure copper for obtaining a union of the manganese and copper, after which the silicium and iron are removed, such process being different from that above mentioned for improving brass and gun-metal by adding ferro-manganese thereto.

What I claim is—

The method of obtaining manganese copper, consisting in melting together copper and ferro-manganese containing silicium, and in cases where the silicium is not present in the ferro-manganese in sufficient quantity adding silicious iron to the ferro-manganese and copper, then separating the silicium and iron from the alloy of manganese and copper, substantially as herein set forth.

GEORGE ALEXANDER DICK.

Witnesses:
   JOHS. BULL,
      186 *Richmond Road, Hackney, London.*
   GEO. S. VAUGHAN,
      57 *Chancery Lane, London.*